(12) United States Patent
Lambert et al.

(10) Patent No.: US 7,978,699 B1
(45) Date of Patent: Jul. 12, 2011

(54) PROTOCOL COMPRESSION WITH SYNCHRONIZED SEQUENCE NUMBERS

(75) Inventors: Paul Aerick Lambert, Mountain View, CA (US); Ranjeet Shetye, Cupertino, CA (US)

(73) Assignee: PicoMobile Networks, Inc., Sunnyvale, CA (US)

( * ) Notice: Subject to any disclaimer, the term of this patent is extended or adjusted under 35 U.S.C. 154(b) by 530 days.

(21) Appl. No.: 11/764,794

(22) Filed: Jun. 18, 2007

Related U.S. Application Data

(60) Provisional application No. 60/860,625, filed on Nov. 21, 2006.

(51) Int. Cl.
H04L 12/56 (2006.01)
(52) U.S. Cl. .......................... 370/392; 370/351; 370/474
(58) Field of Classification Search .................. 370/392, 370/351, 474
See application file for complete search history.

(56) References Cited

U.S. PATENT DOCUMENTS

| | | | |
|---|---|---|---|
| 5,738,583 A | 4/1998 | Comas et al. | |
| 6,272,120 B1 | 8/2001 | Alexander | |
| 6,600,726 B1 | 7/2003 | Nevo et al. | |
| 6,690,935 B1 | 2/2004 | Calot et al. | |
| 6,704,866 B1 * | 3/2004 | Benayoun et al. | 713/151 |
| 6,707,801 B2 * | 3/2004 | Hsu | 370/312 |
| 6,760,587 B2 | 7/2004 | Holtzman et al. | |
| 6,785,892 B1 | 8/2004 | Miller | |
| 6,788,675 B1 * | 9/2004 | Yang | 370/352 |
| 6,793,580 B2 | 9/2004 | Sinclair et al. | |
| 6,795,701 B1 | 9/2004 | Baker et al. | |
| 6,799,056 B2 | 9/2004 | Curley et al. | |
| 6,859,460 B1 | 2/2005 | Chen | |
| 6,879,574 B2 | 4/2005 | Naghian et al. | |
| 6,879,812 B2 | 4/2005 | Agrawal et al. | |
| 6,909,705 B1 | 6/2005 | Lee et al. | |
| 6,932,698 B2 | 8/2005 | Sprogis | |
| 7,013,391 B2 | 3/2006 | Herle et al. | |
| 7,072,323 B2 | 7/2006 | Roberts et al. | |
| 7,073,129 B1 | 7/2006 | Robarts et al. | |
| 7,085,257 B1 | 8/2006 | Karves et al. | |
| 7,097,562 B2 | 8/2006 | Gagner | |
| 7,143,171 B2 | 11/2006 | Eriksson et al. | |
| 7,181,544 B2 | 2/2007 | Vangal et al. | |
| 7,224,964 B2 | 5/2007 | Souissi et al. | |
| 7,236,772 B1 | 6/2007 | Botzas | |
| 7,251,235 B2 | 7/2007 | Wentink | |

(Continued)

OTHER PUBLICATIONS

"Universal Mobile Access: UMA Expands Beyond Dual-Mode Handsets"; The UMA Company; Jan. 2007; 8 pages.

(Continued)

*Primary Examiner* — Dang T Ton
*Assistant Examiner* — Pamit Kaur

(57) ABSTRACT

A system for transmitting data packets includes a sending node. The sending node includes means for forming the data packets using two or more communications protocols. A first protocol includes means to associate with a data load a first header having one or more fields. A second protocol includes means to associate with the data load a second header having one or more fields. The sending node includes compression means for removing one or more fields of the first header. A value of a removed field is predictable by reference to values of one or more fields of the second protocol. A predefined template is used to remove the one or more fields of the first header for compression and to replace the removed field for decompression. The predefined template is identified by a template number included in an added header.

27 Claims, 4 Drawing Sheets

U.S. PATENT DOCUMENTS

| | | | |
|---|---|---|---|
| 7,308,263 B2 | 12/2007 | Gallagher et al. | |
| 7,324,444 B1 | 1/2008 | Liang et al. | |
| 7,400,722 B2 * | 7/2008 | Qi et al. | 380/28 |
| 7,440,430 B1 | 10/2008 | Jagadeesan et al. | |
| 7,452,278 B2 | 11/2008 | Chen et al. | |
| 2002/0151366 A1 | 10/2002 | Walker et al. | |
| 2002/0191560 A1 | 12/2002 | Chen et al. | |
| 2002/0199124 A1 | 12/2002 | Adkisson | |
| 2003/0069018 A1 | 4/2003 | Matta et al. | |
| 2003/0182454 A1 * | 9/2003 | Huth et al. | 709/247 |
| 2003/0231625 A1 * | 12/2003 | Calvignac et al. | 370/389 |
| 2004/0066751 A1 | 4/2004 | Tseng et al. | |
| 2004/0105415 A1 | 6/2004 | Fujiwara et al. | |
| 2004/0127277 A1 | 7/2004 | Walker et al. | |
| 2004/0174829 A1 | 9/2004 | Ayyagari | |
| 2004/0185851 A1 | 9/2004 | Nagai | |
| 2004/0196808 A1 | 10/2004 | Chaskar et al. | |
| 2005/0025163 A1 | 2/2005 | Christie | |
| 2005/0032577 A1 | 2/2005 | Blackburn et al. | |
| 2005/0041660 A1 * | 2/2005 | Pennec et al. | 370/389 |
| 2005/0041793 A1 | 2/2005 | Fulton et al. | |
| 2005/0073980 A1 | 4/2005 | Thomson et al. | |
| 2005/0079873 A1 | 4/2005 | Caspi et al. | |
| 2005/0099977 A1 | 5/2005 | Williams et al. | |
| 2005/0157661 A1 | 7/2005 | Cho | |
| 2005/0177639 A1 | 8/2005 | Reunamaki et al. | |
| 2005/0181872 A1 | 8/2005 | Acharya et al. | |
| 2005/0197189 A1 | 9/2005 | Schultz | |
| 2005/0250487 A1 | 11/2005 | Miwa et al. | |
| 2005/0250497 A1 | 11/2005 | Ghosh et al. | |
| 2005/0268003 A1 | 12/2005 | Wang et al. | |
| 2005/0286456 A1 | 12/2005 | McNew et al. | |
| 2006/0041750 A1 | 2/2006 | Carter et al. | |
| 2006/0045138 A1 | 3/2006 | Black et al. | |
| 2006/0063539 A1 | 3/2006 | Beyer | |
| 2006/0135262 A1 | 6/2006 | Kennedy et al. | |
| 2006/0172736 A1 | 8/2006 | Nevo | |
| 2006/0205409 A1 | 9/2006 | Chiou et al. | |
| 2006/0221857 A1 | 10/2006 | Bushnell et al. | |
| 2006/0268711 A1 | 11/2006 | Doradla et al. | |
| 2007/0026866 A1 | 2/2007 | Krishnamurthi et al. | |
| 2007/0035513 A1 | 2/2007 | Sherrard et al. | |
| 2007/0047547 A1 * | 3/2007 | Conner et al. | 370/392 |
| 2007/0047697 A1 | 3/2007 | Drewry et al. | |
| 2007/0060355 A1 | 3/2007 | Amaitis et al. | |
| 2007/0060358 A1 | 3/2007 | Amaitis et al. | |
| 2007/0076683 A1 | 4/2007 | Chung | |
| 2007/0082671 A1 | 4/2007 | Feng et al. | |
| 2007/0086394 A1 | 4/2007 | Yamada et al. | |
| 2007/0099703 A1 | 5/2007 | Terebilo | |
| 2007/0197237 A1 | 8/2007 | Powell et al. | |
| 2007/0202910 A1 | 8/2007 | Brewer et al. | |
| 2008/0039015 A1 | 2/2008 | Nakata et al. | |
| 2008/0069105 A1 | 3/2008 | Costa et al. | |
| 2008/0095112 A1 | 4/2008 | Wiemann et al. | |
| 2008/0123608 A1 | 5/2008 | Edge et al. | |
| 2009/0191878 A1 | 7/2009 | Hedqvist et al. | |
| 2009/0222358 A1 | 9/2009 | Bednarek | |
| 2010/0093374 A1 | 4/2010 | Dacosta et al. | |

OTHER PUBLICATIONS

IEEE Standards Board. "Part 11: Wireless LAN Medium Access Control (MAC) and Physical Layer (PHY) Specifications." IEEE Std. 802.11, 1999 (R2003); 47 pages.

Meredith, John; "Voice Call Continuity in 3GPP"; CompactPCI and AdvancedTCA systems; Apr. 2006; 2 pages.

Newton, Harry. Newton's Telecom Dictionary: the Official Dictionary of Telecommunications & the Internet. 15th ed. New York: Miller-Freeman, 1999. 762+. Print.

* cited by examiner

RTP header:

| 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| Ver | | | P | X | CC | | | | M | PT | | | | | | Sequence Number | | | | | | | | | | | | | | | |
| Timestamp |||||||||||||||||||||||||||||||||
| SSRC |||||||||||||||||||||||||||||||||
| CSRC [0..15] ::: |||||||||||||||||||||||||||||||||

UDP header:

| 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| Source Port |||||||||||||||| Destination Port ||||||||||||||||
| Length |||||||||||||||| Checksum ||||||||||||||||
| Data ::: |||||||||||||||||||||||||||||||||

IP header:

| 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| Version |||| IHL |||| TOS |||||||| Total length ||||||||||||||||
| Identification |||||||||||||||| Flags ||| Fragment offset |||||||||||||
| TTL |||||||| Protocol |||||||| Header checksum ||||||||||||||||
| Source IP address |||||||||||||||||||||||||||||||||
| Destination IP address |||||||||||||||||||||||||||||||||
| Options and padding ::: |||||||||||||||||||||||||||||||||

FIG. 3

ESP header:

| 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| Security Parameters Index |||||||||||||||||||||||||||||||||
| Sequence number |||||||||||||||||||||||||||||||||
| Payload data ::: |||||||||||||||||||||||||||||||||
| Padding ::: |||||||||||||||| Pad length |||||||| Next header ||||||||
| Authentication data ::: |||||||||||||||||||||||||||||||||

PCP header:

| 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| Timestamp |||||||||||||||||||||||||||||||||
| Length |||||||||||||||| Checksum ||||||||||||||||

ESP header:

| 0 0 | 0 1 | 0 2 | 0 3 | 0 4 | 0 5 | 0 6 | 0 7 | 0 8 | 0 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| Security Parameters Index |||||||||||||||||||||||||||||||||
| Sequence number |||||||||||||||||||||||||||||||||
| Payload data ::: |||||||||||||||||||||||||||||||||
| Padding ::: |||||||||||||||| Pad length |||||||| Next header ||||||||
| Authentication data ::: |||||||||||||||||||||||||||||||||

FIG. 3A

PROTOCOL COMPRESSION WITH SYNCHRONIZED SEQUENCE NUMBERS

The present application claims benefit of Provisional Application No. 60/860,625 filed Nov. 21, 2006, the contents of which are incorporated herein by reference.

FIELD OF THE INVENTION

The present invention relates to data compression and decompression where two or more protocol layers are required for transmission of packets between communication nodes in a computer network.

BACKGROUND OF THE INVENTION

Computer networks support data communications using layered protocols. The commonly used TCP/IP protocols typically have layers of protocols for link, network, transport and application protocol. Efficiency of network communications is of particular concern for wireless or other limited bandwidth networks. Data units used by each of the many layers of protocols in a data communication system are required to carry a protocol header comprised of information used for the data communication system. In the prior art, protocol headers in one layer have contained redundant information as compared with protocol headers in another layer. Due to current protocol specifications for protocol headers among the protocol layers, protocol header information has become to be major percentage of the data communication traffic. The actual data carried in the protocol and data units of a communication layer can often be small in comparison with information contained in the protocol header. While reducing the information contained in the protocol header is a conceptually simple solution to this transmission inefficiency, specifications of each protocol provide for a fixed amount of information in the protocol header and cannot be changed without substantial time and cooperation of the standards authorities. The substantial effect of protocol header traffic is particularly apparent for Internet Protocol-based telephony. Voice communications on IP networks are typically carried out under an RTP protocol. A standards organization for the 3GPP protocol has authoritatively defined data packet structure for data transmission of voice traffic (IP Multimedia Subsystems—IMS) so that the voice data can occupy just 12 bytes of a 112 byte IP packet payload. The following is an example of a protocol header for the IPsec protocol packets, identifying other well known packet fields for this packet:

| Header | Size |
| --- | --- |
| Codec Payload | 12 |
| AMR Payload TOC | 2 |
| RTP | 12 |
| Inner UDP | 8 |
| IP Inner | 20 |
| | |
| Total IPsec Payload | 54 |
| Ipsec ESP Fields | 30 |
| Outer UDP (RFC 3948) | 8 |
| IP Outer | 20 |
| | |
| Total IP Packet Size (B) | 112 |

An obvious inefficiency of transmitting a payload that is small compared to the total IP packet size has led to the development of only a few protocol compression solutions.

A header compression method has been established under IETF standards RFC 1108 or RFC 2508, but these are not suitable for networks that carry voice communications. Another such standard, RFC 1108 is directed to the complexities of TCP traffic and does not provide support for low latency communications. The techniques described in yet another standard, RFC 2508, provide for compression by calculating differences between successive packets. If a packet is lost, the compression algorithms must retransmit and reset the state of the compression. This causes unacceptable latencies and data voice corruption. The Robust Header Compression (ROHC—RFC 3095) specification (described in U.S. Pat. No. 6,608,841) also use a header difference mechanism. Yet another standard, RFC 3095, provides improvements in environments with packet loss, but still uses a difference based dynamic compression.

Existing header compression solutions do not support encryption. Encryption of communications with a protocol like the IETF defined Encapsulating Security Protocol (RFC 2406) encrypts all of the contained headers making them uncompressible, and thereby unavailable for use until decrypted. Compression applied to the protocols within the ESP packet would result in a minor benefit to packet size but would still result in protocol and data unit redundancy among the layers' protocol headers and the potential for compression in the ESP protocol.

Some prior art protocol compression techniques require that only the information that is different on each packet is identified. These differences can vary from packet to packet and require the use of difference fields that are type/length/value delimited. These differences are often predictable and this predictability is not considered in the existing designs making them considerably more complex than is necessary. Specifically, a preferred traffic method for voice communications has a simple profile. Complex techniques for more stateful protocols that support retransmission are not required and more simple template based mechanism can be used. More efficient implementations are possible when the protocols used for carrying data can be constrained to profiles that do not support retransmission or fragmentation. In this case, and sequences numbers carried in the protocol layers will always be synchronized. As a lower layer protocols sequence number increases, the higher level protocols sequence number will be incremented identically. In this manner, given an appropriate template for the header compression that describes which fields need to be left out, the sequence numbers can be directly reconstructed.

These templates can be even more efficient if they use knowledge from lower uncompressed layers (like ESP). The ESP protocol provides sequence numbers, data confidentiality (encryption) and data integrity (cryptographic checksum). The ESP sequence number can be used to directly determine the sequence number of a upper layer protocol that is uniquely bound to the ESP protocols security association. The services provided by ESP data integrity can be used to completely replace any checksum carried internal to the ESP packet. Specifically UDP checksums are not required. There is no need to carry this field.

Current specifications for 3GPP and IETF are easily obtained.

3GPP Specifications may be obtained at http://www.3gpp.org/specs/numbering.htm. The following are a selection of those specifications:

TS 21.905 Vocabulary for 3GPP Specifications
TS 22.340 IMS Messaging; Stage 1
TS 23.002 Network Architecture
TS 23.218 IMS session handling; IM call model; Stage 2

TS 23.221 Architectural Requirements
TS 23.228 IMS stage 2
TS 23.234 WLAN interworking
TS 24.228 Signalling flows for the IMS call control based on SIP and SDP; Stage 3
TS 24.229 IMS call control protocol based on SIP and SDP; Stage 3
TS 29.162 Interworking between the IMS and IP networks
TS 33.102 3G security; Security architecture
TS 33.203 3G security; Access security for IP-based services
TS 33.210 3G security; Network Domain Security (NDS); IP network layer security
TR 33.978 Security aspects of early IP Multimedia Subsystem (IMS)

IETF Specifications are also well known in the art. The following a current list thereof:

RFC 2327 Session Description Protocol (SDP)
RFC 2748 Common Open Policy Server protocol (COPS)
RFC 2782 a DNS RR for specifying the location of services (SRV)
RFC 2806 URLs for telephone calls (TEL)
RFC 2915 the naming authority pointer DNS resource record (NAPTR)
RFC 2916 E.164 number and DNS
RFC 3087 Control of Service Context using SIP Request-URI RFC 3261 Session Initiation Protocol (SIP)
RFC 3262 reliability of provisional responses (PRACK)
RFC 3263 locating SIP servers
RFC 3264 an offer/answer model with the Session Description Protocol
RFC 3265 SIP-Specific Event Notification
RFC 3310 HTTP Digest Authentication using Authentication and Key Agreement (AKA)
RFC 3311 update method
RFC 3312 integration of resource management and SIP
RFC 3319 DHCPv6 options for SIP servers
RFC 3320 signalling compression (SigComp)
RFC 3323 a privacy mechanism for SIP
RFC 3324 short term requirements for network asserted identity
RFC 3325 private extensions to SIP for asserted identity within trusted networks
RFC 3326 the reason header field
RFC 3327 extension header field for registering non-adjacent contacts (path header)
RFC 3329 security mechanism agreement
RFC 3420 Internet Media Type message/sipfrag
RFC 3428 SIP Extension for Instant Messaging
RFC 3455 private header extensions to SIP for 3GPP
RFC 3485 SIP and SDP static dictionary for signaling compression
RFC 3515 the SIP REFER method
RFC 3550 Real-time Transport Protocol (RTP)
RFC 3574 Transition Scenarios for 3GPP Networks
RFC 3588 DIAMETER base protocol
RFC 3589 DIAMETER command codes for 3GPP release 5 (informational)
RFC 3608 extension header field for service route discovery during registration
RFC 3665 SIP Basic Call Flow Examples
RFC 3680 SIP event package for registrations
RFC 3725 best current practices for Third Party Call Control (3 pcc) in SIP
RFC 3824 using E164 numbers with SIP
RFC 3840 indicating user Agent Capabilities in SIP
RFC 3841 caller preferences for SIP
RFC 3842 SIP event package for message waiting indication and summary
RFC 3856 SIP event package for presence
RFC 3891 the SIP Replaces Header
RFC 3903 SIP Extension for Event State Publication
RFC 3911 the SIP Join Header
RFC 4028 session timers in SIP
RFC 4235 an INVITE-Initiated dialog event package for SIP
RFC 4475 Session Initiation Protocol (SIP) Torture Test Messages There is a need for a system of communication via packet networks where protocol processing, compression and encryption is made more efficient by adaptation of coordination of sequence numbers between layer protocols and the integration of encryption protocol processing into the compression and decompression process.

SUMMARY OF THE INVENTION

The present invention is a method and system for a more efficient transmission of data packets over a packet network operating under multiple protocol layers, where two or more adjacent protocol layers require that each protocol and data unit comprise a protocol header containing information usable by the protocol. Protocol layers are defined as being above another protocol layer if the higher protocol layer requires fewer steps to reach or identical with an application layer. The system of the present invention provides for compression and decompression of data packet protocols in order to reduce the total IP packet size. This sizes reduction can be accomplished by the removal of certain protocol fields and their replacement with invention means without loss of the functions intended for performance of the protocol for the changed packet.

In a preferred embodiment, a compression/decompression template is created for certain fields in protocol headers of two or more protocol layers based upon a relating sequence numbers of at least one higher level protocol field to a sequence number of a lower level protocol field, where the higher level protocol field is nested in a lower level protocol for an efficient transmission between the sending and receiving nodes. The predictable relationship of a sequence number of one protocol layer to a sequence number of another protocol layer handling the same data load is referred to herein as synchronization. Predictability means causing sequence numbers of such data-load related process data units and to be identical or to be related to each other by a predetermined algorithm whereby, at any time, a sequence number of a protocol data unit of one layer can be used to exactly determine a sequence number of a protocol data unit of another layer. Sequence numbers in the available protocols are predictable, providing a basis for synchronization algorithms for relating sequence numbers from protocol data units of different communication system layers.

In one embodiment, the invention method and system acts to remove one or more protocol fields from protocol headers formed by operation of a layer's protocol. The device performing the protocol field removal is a sending node or device (such as a cellular, VoIP or similarly equipped telephone or from a device where an IP network forms a link in a data communications path from a sending node to a receiving node).

Removal of a protocol field which would have resided in a nested protocol header reduces the total IP packet size for transmission by a sending node. With reference to the above example of a voice data packet, it will be appreciated that removing one or more nested sequence number fields from the packet will significantly reduce the total IP packet size.

At a receiving node or unit, a microprocessor with a control program acts to receive the invention data packet having one or more nested protocol fields removed for transmission. The receiving node or unit, having stored information and functions in the microprocessor for acting upon the invention data packet, uses a predefined template and predefined expansion functions so that the protocol fields removed by the sending node's microprocessor and control program are replaced at the receiving node for full utilization of the functions of each layer of protocols for receipt of the invention packets. The receiving node comprises means for, from comparison of a received invention packet to a field replacement template, predicting and replacing removed, synchronized sequence numbers.

By imposing synchronization of sequence number fields that remain the same or predictably change to be synchronized in different protocol layers, the process of protocol processing and compression can be greatly simplified, thereby enhancing transmission speed and reducing bandwidth use. This synchronization is viable for layered protocols that support comparable retransmission mechanisms and comparable fragmentation mechanisms.

The various protocol header fields of data communications protocols are well known. Sequence number fields in the header fields and methods for providing an initiating sequence number are also well known. Sequence numbers in a sequence number field are generally increased by a single unit for each successive protocol data unit. In many protocols, sequence numbers are chosen at random to minimize the risk of system mis-use or hacking. In the invention system, a reference sequence number can be chosen at random, or by a predetermined mechanism, whereafter sequence numbers for header fields of other protocols are predictably related or synchronized to the reference sequence number.

The following is a specific example of synchronization for a protocol stack for Internet Protocol Multimedia Subsystem. The Internet Protocol Multimedia Subsystem (IMS) is described above. Network and transport layer protocols, respectively, Internet protocol (IP) and real-time transport protocol (RTP), use sequence numbers independently generated by their respective protocols. Both IP and RTP use sequence numbers that track lost data by identifying sequence numbers of protocol data units (PDU's) that have not been received at a receiver's node. The sequence numbers of PDU's identified as lost or not received under IP and TCP of a receiver's node do not directly cause a sender's node to re-transmit lost or missing PDU's.

An exemplary protocol stack is as follows for this example: IP, UDP, ESP, IDP, UDP and RTP. The protocols themselves are modified to provide for synchronization of sequence numbers which occur in some PDU's of the communication protocols. Processing at the sender's node of these modified network and transport layer protocols results in a sequence number of a lowest layer protocol from which the sequence number of any higher layer can be predicted and/or calculated.

In a particularly and surprisingly beneficial application of synchronization of sequence numbers of these protocols, sequence number and Security Parameters Index (SPI, as a session identifier) fields of an Encapsulating Security Payload (ESP of the IP Security suite of network protocols) are used to effectively predict or establish by calculation sequence numbers of the encrypted IP, UDP, and RTP PDU's within the ESP PDU. It will be apparent from this disclosure that lower layer ESP session identifiers and sequence numbers can be modified so that sequence numbers of higher layer protocols other than those shown in the specific example above may be encapsulated, compressed or encrypted in the payload are predicted or calculable from information in the ESP session identifiers and sequence numbers. In short, IPsec-UDP-RTP protocols can be compressed (and whose sequence numbers are thereby made unavailable without decompression—re-compression steps) without loss of access to those inner sequence numbers by using knowledge that a particular IPsec Security Association directly implies a UDP format and specific RTP header within the payload. The sequence number in the RTP header encapsulated thereby can be predicted and/or calculated after compression by using a known starting sequence number of the RTP sequence numbers and incrementing the recreated counter by the same amount as the necessarily increased IPsec sequence number.

Another surprising benefit of the synchronization and linkage of security processing to the upper layer protocol processing is the ability to completely remove changing but redundant fields. As a specific example using the previous example of IMS protocols stacks, the inner UDP checksum does not need to be transmitted and can be removed even though it is different for every packet. The services provided by the synchronized protocol layers can be treated as a whole. In the IMS protocol stack, the ESP protocol provides a integrity check. The integrity of the UDP packet is not required since the ESP integrity check fully covers the inner protocols.

One object of the invention is to provide for synchronization, duplication, relation and/or algorithm-based prediction among sequence numbers generated for PDU's of two or more communications protocols, thereby enabling compression of higher layer PDU's and implicit determination of higher layer protocol sequence numbers.

Another object of the invention is to provide adapted field generation of ESP headers to contain sufficient information from which option fields of compressed or encrypted payload PDU's can be determined.

Yet another object of the invention is to provide an ESP sequence number to map (by prediction or calculation) to an RTP sequence number compressed or encrypted in the payload, whereby RTP frame formats are determined solely by reference to the ESP sequence number.

Further objects of the invention are as follows:

Sequence numbers used in two or more (either adjacent or non-adjacent) layers, where one of the layers is the data link layer, are made synchronous by a synchronizing algorithm in a control program operating a mobile device with a baseband communication processor and one or more host protocol processors, where synchronous sequence numbers become a common attribute linking operation of the functions of the multiple layers. This linking attribute becomes an integral part of compression provided for over two or more protocol components.

A mobile device has a baseband communication processor and one or more host protocol processors where a control program comprises means where a protocol identifier is assigned to a data unit of a protocol layer lower and to a data unit of an upper layer. The layers may be adjacent or non-adjacent. The protocol identifier implicitly determines the value of compressed fields of the data unit(s) of the upper level which comprise the data unit of the lower level.

An IP Multimedia System comprising a client and a server, where RTP and ESP sequence numbers are assigned by a control program prior to transmission from a server to a client. Sequence numbers, a well known portion of data units created by RTP and ESP, are synchronized by the control program to accomplish objects of the invention described above.

An IP Multimedia System comprising a client and a server, where a control program of the server uses IPsec ESP to assign to a data unit an ESP header which may be interpreted by said control program to determine inner IP addresses of the data unit, with which information on inner IP addresses compression of the data unit is performed.

An IP Multimedia System comprising a client and a server, where a control program of the server uses IPsec ESP to assign to a data unit an ESP header which may be interpreted by said control program to determine inner IP option fields.

An IP Multimedia System comprising a client and a server, where a control program of the server uses IPsec ESP to assign to a data unit an ESP header which may be interpreted by said control program to map to an RTP sequence number or to determine RTP frame formats.

BRIEF DESCRIPTION OF THE DRAWINGS

FIGS. 3 and 3A show exemplary protocol headers for the invention system.

DETAILED DESCRIPTION OF THE INVENTION

Figure 1:
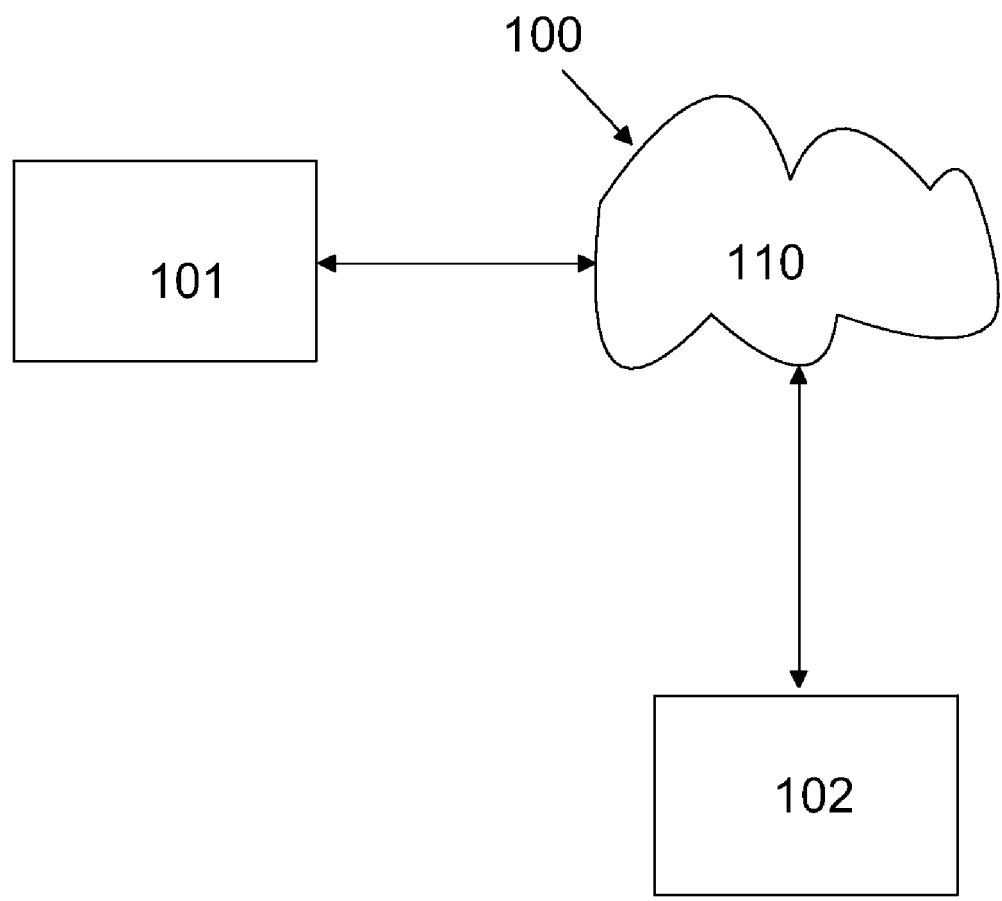
FIG. 1 is a block diagram of a transmitting voice data source, a receiving voice data recipient, and a packet network to facilitate voice data communication between the source and recipient.

FIG. 1 shows the invention communication data path 100 comprising a sending node or sender 101 in data communications with receiving node or recipient 102 via a packet network 110, where sender 101 and recipient 102 each comprise a microprocessor and a control program for accomplishing the objects of the invention, including communication link means for establishing data communication sessions with packet network 110. Network 110 is preferably an IP network operating under multiple, adjacent layers of communications protocols as currently used for data packet communications. In one embodiment of the invention, sender 101 comprises means for input of voice of a user of sender 101, whereupon voice data packets are formed by operation of the control program of sender 101 and are transmitted to recipient 102 via network 110. Two communications protocols operate on data to be transmitted from sender 101 to recipient 102. A first protocol is one which is higher or precedes a second protocol which is lower or succeeds the first protocol in acting upon data to be transmitted to the recipient 102. Both the first and second protocols require that a protocol header formed with one or more protocol fields comprise part of a their process data unit (such as a packet), which process data units are formed by action of the protocols.

The identification of first and second communications protocols do not limit the total number of successively processing communications protocols which may act upon readying a data load for transmission at the sending node. Neither do the first and second communications protocols be immediately successive in such processing, such that the first communications protocol may be, for example, a first, second or third communications protocol acting on said data load and the second communications protocol may be the second or higher communications protocol acting upon said data load.

Figure 2:
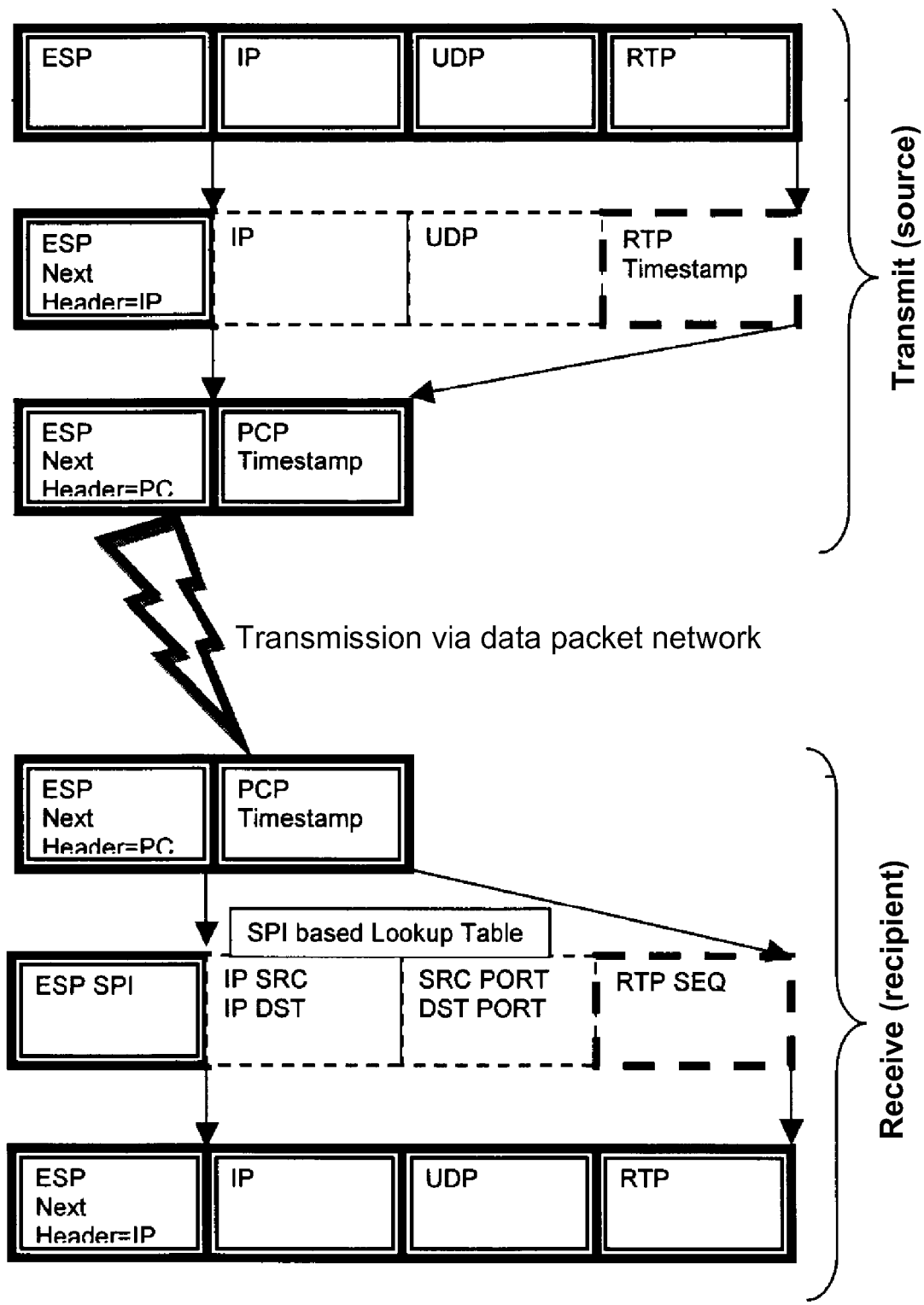
FIG. 2 is a flow diagram showing preparation of voice data in the data source device and processing of that voice data by the data recipient device.

FIG. 2 shows a specific example of successive processing by communications protocols of a specific data load. A top and next lower level of processing for the transmit (source) node shows that IP, UDP and/or RTP processing has occurred for a specific data load, each associating its appropriate protocol header to the data load, whereafter ESP acts to encapsulate the output of that processing. Just prior to said encapsulation, the control program of the transmit (source) node acts to remove one or more protocol header fields of the IP, UDP and/or RTP protocol headers. At a final processing just prior to transmission by a data packet network, ESP operates to provide yet another protocol header and associates a PCP timestamp with it. This finally processed packet is transmitted via a data packet network to the receive (recipient) node where a substantially similar process performed at the transmit (source) node, except in reverse.

At a first, lowest layer processing, the ESP packet is received an then further processed to provide an ESP SPI, from which the control program of the receive (recipient) node acts to detect that nested protocol fields have been removed, act upon values in the ESP SPI for comparison values or algorithms in an SPI based look up table which are further acted upon to determine values of the removed nested protocol fields, and thereafter process said received packet to restore to the nested removed protocol fields their original values prior to decoding for playout of the received packet.

FIG. 3 shows protocol headers for the IP, UDP and RTP processing step at the top level of FIG. 2 for the transmit (source) node. A top table of FIG. 3A shows an exemplary ESP protocol header after the second, next lowest processing of FIG. 2 for the transmit (source) node. A second from the top table of FIG. 3A shows an exemplary PCP protocol header after the third and last processing of FIG. 2 for the transmit (source) node. It will be appreciated that the sequence number of the PCP header is alone sufficient to predict the identical sequence numbers of the other protocol headers. It will be instantly appreciated that other protocol fields, such as checksum, may be removed at an earlier processing step at the sending node and which may be quickly replaced thereat by operation of a template or replacement function of the receiving node.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:

1. A system for transmission of data packets from a sending node to a receiving node via a data packet network, the sending node comprising:
    means for forming the data packets using two or more communications protocols, wherein:
        a first communications protocol comprises means to associate with a data load a first protocol header having one or more protocol fields, and
        a second communications protocol comprises means to associate with the data load a second protocol header having one or more protocol fields;
    compression means for removing one or more of the protocol fields of the first protocol header, wherein a value of a removed protocol field is predictable by reference to values of one or more protocol fields of the second communications protocol; and transmission means for transmitting the data load to the data packet network after operation of the first and second communications protocols and the compression means, wherein the receiving node comprises:

template means for recognizing the protocol fields in the second protocol header; and field prediction means for operating upon values of the one or more of the protocol fields of the second protocol header to determine the value of the removed protocol field.

2. The system of claim 1, wherein the sending node transmits the data load via the data packet network to the receiving node and one or more recipient nodes comprising decompression means.

3. The system of claim 1, wherein transmissions from the sending node are via broadcast packets.

4. The system of claim 1, wherein the second communications protocol includes an encapsulation security protocol (ESP), and wherein the second protocol header comprises a protocol identification identifying to the receiving node that a received packet is compressed by the sending node.

5. The system of claim 1, wherein the second communications protocol includes a user datagram protocol (UDP), and wherein the second protocol header comprises a protocol identification identifying to the receiving node that a received packet is compressed by the sending node.

6. The system of claim 1, wherein the removed protocol field includes at least one of a sequence number, a checksum, and a protocol field from a nested protocol header.

7. The system of claim 1, wherein the first communications protocol includes a user datagram protocol (UDP) and means for encapsulating UDP fields output by an encapsulating security protocol (ESP).

8. The system of claim 1, wherein the first and second communications protocols include protocols from a group consisting of an encapsulation security protocol (ESP), a user datagram protocol (UDP), an Internet protocol (IP), and a real time protocol (RTP) defined by Internet Engineering Task Force (IETF).

9. The system of claim 1, wherein the first and second communications protocols operate under standards developed for Internet protocol (IP) multimedia subsystems (IMS) by 3rd Generation Partnership Project (3GPP).

10. The system of claim 1, wherein the compression means further comprise means to select the one or more of the protocol fields of the first protocol header for removal based upon negotiation via an Internet Key Exchange (IKE) protocol.

11. A system for transmission of data packets from a sending node to a receiving node via a data packet network, the sending node comprising:

means for forming the data packets using two or more communications protocols, wherein:

a first communications protocol comprises means to associate with a data load a first protocol header having one or more protocol fields, and a second communications protocol comprises means to associate with the data load a second protocol header having one or more protocol fields;

compression means for removing one or more of the protocol fields of the first protocol header, wherein a value of a removed protocol field is predictable by reference to values of one or more protocol fields of the second communications protocol; and transmission means for transmitting the data load to the data packet network after operation of the first and second communications protocols and the compression means, wherein a predefined template is used to remove the one or more of the protocol fields of the first protocol header for compression and to replace the removed protocol field for decompression, and wherein the predefined template is identified by a template number included in an added protocol header.

12. The system of claim 11, wherein the sending node further comprises a microprocessor and a control program for operating the first and second communications protocols and the compression means.

13. The system of claim 11, wherein after transmission of the data load to the data packet network, the data load is transmitted to the receiving node.

14. The system of claim 11, wherein the receiving node comprises a microprocessor and a control program for operating decompression means for receiving the data packets from the sending node.

15. The system of claim 11, wherein the removed protocol field includes a sequence number.

16. The system of claim 11, wherein the removed protocol field includes a checksum.

17. The system of claim 11, wherein the first communications protocol includes a user datagram protocol (UDP) and means for encapsulating UDP fields output by an encapsulating security protocol (ESP).

18. The system of claim 11, wherein the first and second communications protocols include protocols from a group consisting of an encapsulation security protocol (ESP), a user datagram protocol (UDP), an Internet protocol (IP), and a real time protocol (RTP) defined by Internet Engineering Task Force (IETF).

19. The system of claim 11, wherein the first and second communications protocols operate under standards developed for Internet protocol (IP) multimedia subsystems (IMS) by 3rd Generation Partnership Project (3 GPP).

20. The system of claim 11, wherein the compression means further comprise means to select the one or more of the protocol fields of the first protocol header for removal based upon negotiation via an Internet Key Exchange (IKE) protocol.

21. The system of claim 11, wherein the receiving node comprises:

template means for recognizing the protocol fields in the second protocol header; and field prediction means for operating upon values of the one or more of the protocol fields of the second protocol header to determine the value of the removed protocol field.

22. The system of claim 21, wherein the sending node transmits the data load via the data packet network to the receiving node and one or more recipient nodes comprising decompression means.

23. The system of claim 21, wherein transmissions from the sending node are via broadcast packets.

24. The system of claim 21, wherein the second communications protocol includes an encapsulation security protocol (ESP), and wherein the second protocol header comprises a protocol identification identifying to the receiving node that a received packet is compressed by the sending node.

25. The system of claim 21, wherein the second communications protocol includes a user datagram protocol (UDP), and wherein the second protocol header comprises a protocol identification identifying to the receiving node that a received packet is compressed by the sending node.

26. The system of claim 11, wherein the predefined template is based upon relating a sequence number of a higher-level protocol field to a sequence number of a lower-level protocol field, wherein the higher-level protocol field is nested in the lower-level protocol field.

27. The system of claim 11, wherein the removed protocol field includes a protocol field from a nested protocol header, and wherein the nested protocol header is a protocol header in which a higher-level protocol field is nested in a lower-level protocol field.

* * * * *